(12) United States Patent
Lyon et al.

(10) Patent No.: US 10,496,553 B2
(45) Date of Patent: Dec. 3, 2019

(54) THROTTLED DATA MEMORY ACCESS

(71) Applicant: Hewlett Packard Enterprise Development LP, Houston, TX (US)

(72) Inventors: Geoff M. Lyon, Half Moon Bay, CA (US); Amip J. Shah, Santa Clara, CA (US); Henry Sang, Cupertino, CA (US); Henri J. Suermondt, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/570,767

(22) PCT Filed: May 1, 2015

(86) PCT No.: PCT/US2015/028952
§ 371 (c)(1),
(2) Date: Oct. 31, 2017

(87) PCT Pub. No.: WO2016/178658
PCT Pub. Date: Nov. 10, 2016

(65) Prior Publication Data
US 2018/0121372 A1 May 3, 2018

(51) Int. Cl.
*G06F 12/00* (2006.01)
*G06F 12/14* (2006.01)
(Continued)

(52) U.S. Cl.
CPC ...... *G06F 12/1466* (2013.01); *G06F 12/1408* (2013.01); *G06F 12/1425* (2013.01);
(Continued)

(58) Field of Classification Search
None
See application file for complete search history.

(56) References Cited

U.S. PATENT DOCUMENTS 4,247,913 A * 1/1981 Hiniker ............... G11C 11/4074
365/226
5,159,679 A    10/1992 Culley
(Continued)

FOREIGN PATENT DOCUMENTS

EP       1519275       3/2005

OTHER PUBLICATIONS

Charles Severance, "High Performance Computing", available at https://archive.org/details/HighPerformanceComputing (2009).
(Continued)

*Primary Examiner* — David Yi
*Assistant Examiner* — Craig S Goldschmidt
(74) *Attorney, Agent, or Firm* — Hewlett Packard Enterprise Patent Department

(57) ABSTRACT

Examples relate to providing throttled data memory access. In some examples, a locking mechanism is used to activate a corresponding memory lock after receiving a first read access cycle. While the corresponding memory lock is active, responses to subsequent read access cycles are prevented. After the corresponding memory lock deactivates, a second read access cycle is responded to with access to the memory.

18 Claims, 4 Drawing Sheets

(51) Int. Cl.
*G06F 13/16* (2006.01)
*G06F 21/85* (2013.01)
*G06F 9/52* (2006.01)
*G06F 21/00* (2013.01)

(52) U.S. Cl.
CPC .............. *G06F 13/16* (2013.01); *G06F 21/85* (2013.01); *G06F 9/52* (2013.01); *G06F 21/00* (2013.01); *G06F 2212/1052* (2013.01)

(56) References Cited

U.S. PATENT DOCUMENTS

| | | | |
|---|---|---|---|
| 7,240,167 | B2 | 7/2007 | Shirogane et al. |
| 7,437,510 | B2 | 10/2008 | Rosenbluth et al. |
| 8,156,247 | B2 | 4/2012 | McMillen |
| 8,590,332 | B2 | 11/2013 | Wyatt |
| 8,650,367 | B2 | 2/2014 | Floyd et al. |
| 9,202,593 | B1 * | 12/2015 | Magia .................. G11C 11/5628 |
| 2001/0014036 | A1 * | 8/2001 | Rapp ....................... G11C 16/22 365/185.04 |
| 2005/0073901 | A1 | 4/2005 | Han |
| 2005/0289292 | A1 * | 12/2005 | Morrow .................. G06F 1/206 711/105 |
| 2006/0242326 | A1 | 10/2006 | Camiel |
| 2007/0198781 | A1 | 8/2007 | Dice et al. |
| 2009/0166805 | A1 * | 7/2009 | Yun ......................... H01L 28/40 257/532 |
| 2009/0168944 | A1 | 7/2009 | Song et al. |
| 2009/0243732 | A1 * | 10/2009 | Tarng ....................... H03B 5/04 331/18 |
| 2013/0054898 | A1 | 2/2013 | Rohe et al. |
| 2013/0212345 | A1 | 8/2013 | Nakajima |

OTHER PUBLICATIONS

International Search Report and Written Opinion received for PCT Patent Application No. PCT/US2015/028952, dated Jan. 29, 2016, 10 pages.

International Preliminary Report on Patentability received for PCT Patent Application No. PCT/US2015/028952, dated Nov. 16, 2017, 9 pages.

European Search Report and Search Opinion Received for EP Application No. 15891348.3, dated Mar. 8, 2018, 7 pages.

* cited by examiner

THROTTLED DATA MEMORY ACCESS

BACKGROUND

Modern techniques for securing information in computational environments conventionally involve data encryption with key exchange and/or password based authentication to provide access. Such techniques are implemented as software that can be compromised by malicious attacks. Because the software controls the access to the data, a successful malicious attack can result in the malicious actor having full access to the data of a computational environment.

BRIEF DESCRIPTION OF THE DRAWINGS

The following detailed description references the drawings, wherein.

DETAILED DESCRIPTION

As detailed above, software can be used to secure a computing device by using data encryption. However, if such software is compromised, malicious actors can gain full access to the data of the computing device. Examples disclosed herein can make it more difficult for a malicious entity to remotely steal large volumes of data from a compromised system. Specifically, while most existing approaches focus on restricting access to the system via software, the proposed solution physically limits the amount of data that could be accessed in a system via hardware, which serves as a disincentive to potential data theft.

Generic computer memory and data access logic is often optimized for read/write (i.e., access speed) performance and generally provides open access to software regardless of the content's sensitivity. As a result, data access restrictions are often implemented as higher-level software features, which can be subject to malicious comprise by remote entities. Instead, examples described herein limit the rate of access to data within a chosen memory location, locations, or entire blocks, where no means (software or otherwise) to override or by-pass the access throttle are available. Thus, modifications of the system are restricted by physical access to the device at the hardware level.

Software-based techniques for secure computation and data encryption offer methods to analyze and store data in a secure form; however, the available repertoire of analytic methods is somewhat restrictive. By comparison, limiting the rate of data that can be accessed per unit time (e.g., via self-clearing memory access lock embedded within the system memory and or access controller) is intended to frustrate the interrogator since the small chunks of data that can be accessed would be useless until a sufficient number of chunks have been aggregated, which should take too long to be effective.

Figure 1:
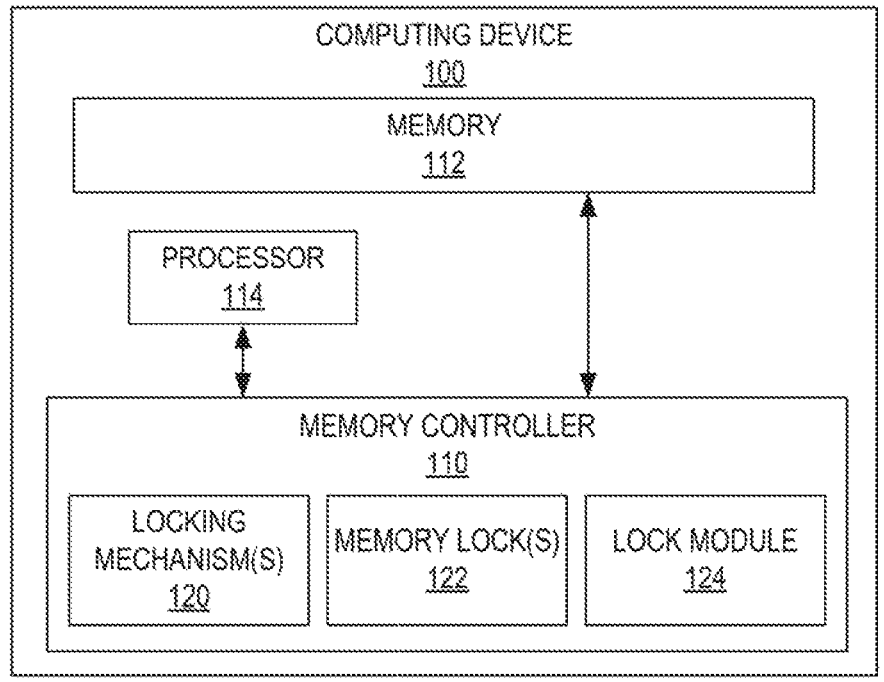
FIG. 1 is a block diagram of an example computing device for providing throttled data memory access.

Referring now to the drawings, FIG. 1 is a block diagram of an example computing device 100 for providing throttled data memory access. Computing device 100 may be any device capable of providing computing services such as a desktop computer, a laptop, a tablet, a smartphone, a web server, data server, or other computing device. In the example of FIG. 1, computing device 100 includes memory controller 110, memory 112, and processor 114.

Memory controller 110 may be any number of digital circuits and/or other hardware devices suitable for providing throttled data memory access. Memory controller 110 may fetch, decode, and execute instructions to enable throttling, as described below. As an alternative, or in addition, to retrieving and executing instructions, memory controller 114 may include any number of electronic circuits comprising a number of electronic components for performing the functionality of locking mechanism(s) 120, memory lock(s) 122, and lock module 124. In contrast to processor 114, memory controller 110 is a dedicated component for managing access to memory 112.

Memory 112 may be any electronic, magnetic, optical, or other physical storage device that stores data for computing device 100. Thus, memory 112 may be, for example, Random Access Memory (RAM), Read-Only Memory (ROM), Electrically-Erasable Programmable Read-Only Memory (EEPROM), flash memory, and the like.

Processor 114 may be central processing unit(s) (CPUs), microprocessor(s), and/or other hardware device(s) suitable for retrieval and execution of instructions. Processor 114 may fetch, decode, and execute instructions to provide services such as web services, data services, etc. As an alternative or in addition to retrieving and executing instructions, processor 114 may include electronic circuits comprising a number of electronic components for performing such functionality.

Locking mechanism(s) 120 of memory controller 110 correspond to hardware components that respond to read access of memory 112. For example, a locking mechanism 120 such as a voltage gate can activate every time a portion of memory 112 is accessed. In another example, the locking mechanism 120 can activate if a portion of memory is activated a preconfigured number of times during a time interval. Because the locking mechanism 120 is hardware-based, the locking mechanism 120 cannot be circumvented by malicious attacks on software of computing device 100.

While a locking mechanism 120 is active, a corresponding memory lock 122 is also active to prevent access to a portion of memory 112. Memory lock(s) 122 can be flags stored in, for example, a look-up table of memory controller 110, where each flag is associated with a portion of memory 110. When a memory lock 122 is active, the corresponding portion of memory 112 is inaccessible at a hardware level. For example, each word or line of memory 112 can be associated with a corresponding memory lock 122 that controls access to the word or line. In another example, the memory locks 122 can be activated in a cascading sequence, where a whole memory lock that throttles access to the entire memory 112 is activated when a threshold number of memory locks 122 have been activated. Memory lock(s) 122 can be self-clearing locks, designed to self-expire (i.e., reset) after a preconfigured interval following being triggered. For example, memory lock(s) 122 can be non-refreshing DRAM cell(s).

Lock module 124 manages locking mechanism(s) 120 and memory lock(s) 122. Specifically, locking module 124 can allow an administrator to configure the locking mechanism(s) 120 and memory lock(s) 122. For example, locking module 124 may be used to set the lock threshold for a cascading sequence of memory locks. In another example, locking module 124 may be used to override the locking mechanism(s) 120 and/or memory lock(s) 122 to bypass any throttling. In some cases, bypass functionality can be excluded from lock module 124 to further protect memory controller 110 from malicious attacks.

Figure 2:
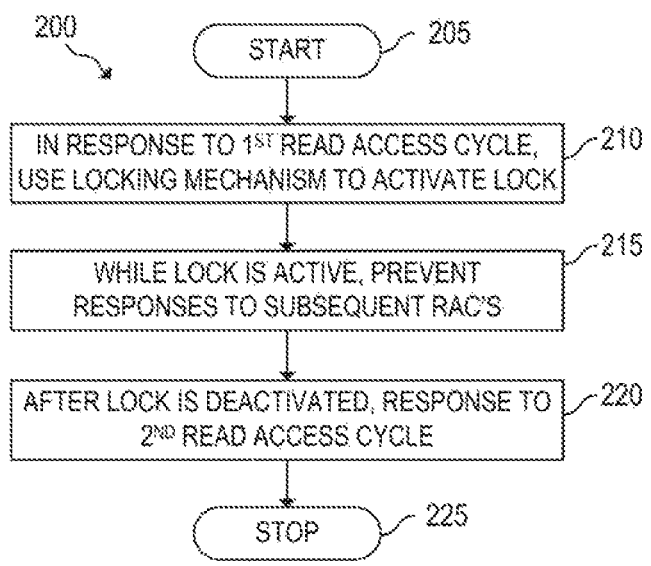
FIG. 2 is a flowchart of an example method for execution by a computing device for providing throttled data memory access.

FIG. 2 is a flowchart of an example method 200 for execution by computing device 100 for providing throttled data memory access. Although execution of method 200 is described below with reference to computing device 100 of FIG. 1, other suitable devices for execution of method 200 may be used, such as memory controller 310 of FIG. 3. Method 200 may be implemented in the form of executable instructions stored on a machine-readable storage medium and/or in the form of electronic circuitry.

Method 200 may start in block 205 and continue to block 210, where computing device 100 uses a locking mechanism to activate a memory lock in response to a first read access cycle (RAC) of memory. For example, a voltage gate of computing device 100 can be charged when the memory is accessed, where charging the voltage gate activates the memory lock. In block 215, computing device 100 prevents access to a corresponding portion of the memory while the memory lock is active.

In block 220, computing device 100 responds a second RAC of the memory after the memory lock is deactivated. In this example, the memory lock may deactivate when the voltage gate discharges. For example, the lock can be designed to self-expire (i.e., reset) after a preconfigured interval following being triggered during a typical memory access cycle. In this example, the second RAC is responded to after the lock self-expires. Method 200 may then continue to block 225, where method 200 may stop.

Figure 3A:
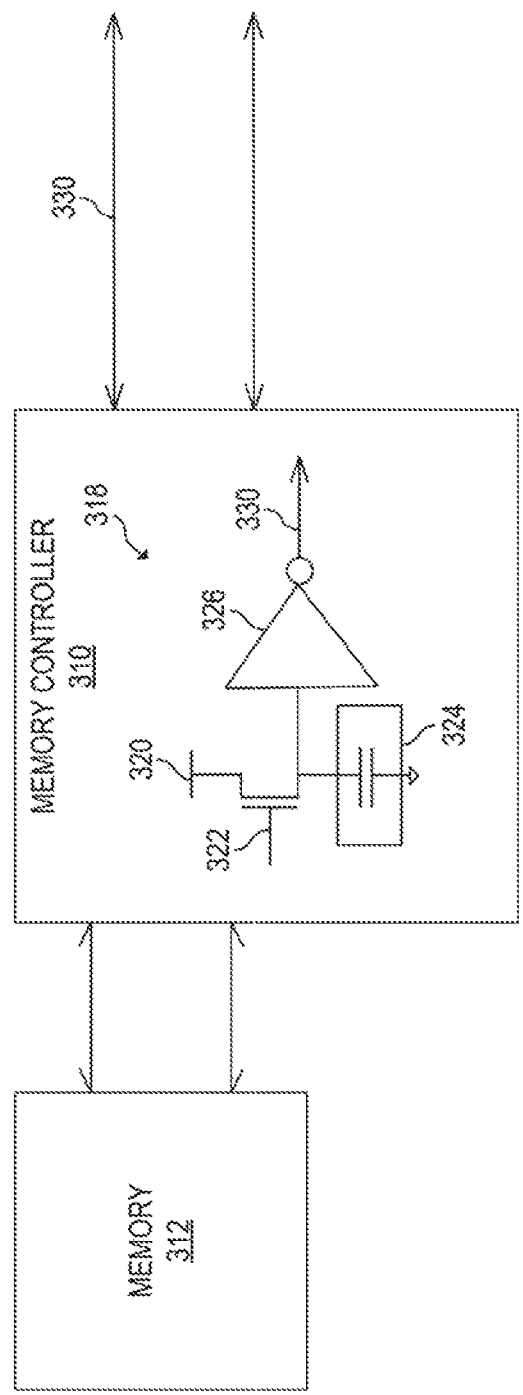
FIG. 3A is a block diagram of an example memory device in communication with an example memory for providing throttled data memory access.

FIG. 3A is a block diagram of an example memory controller 310 in communication with memory 312. As illustrated in FIG. 3A and described below, memory controller 310 may provide throttled data memory access to memory 312. Memory controller 310 and memory 312 may be substantially similar to memory controller 110 and memory 112 of FIG. 1.

As illustrated, memory controller 310 includes a memory cell 318 that includes a locking mechanism. Memory cell 318 includes supply voltage 320, read access 322, capacitor 324, inverter 326, and memory lock 330. When an RAC is initiated a signal is received via read access 322, a switch is opened to allow supply voltage 320 charge capacitor 324 and activate inverter 326, which in turn activates memory lock 330. While memory lock 330 is active, subsequent RAC's are denied or lengthened, resulting in, for example, memory access errors, memory access denials, holding of the memory cycle until the corresponding lock deactivates, etc. In such cases, data access is either denied or lengthened, thus throttling repeated data access attempts to memory 312 in quick succession. Similar to FIG. 1, memory lock 330 can be a non-refreshing DRAM cell. The duration of the memory lock 330 could be determined by the physical properties of the memory cell 318. For example, DRAM refresh rates may be on the order of every 64 mS thereby limiting the number of read access cycles of the memory 312 to around 15 per second. In other examples, the lock duration could be scaled by tuning of the cells physical properties during design and fabrication to suit the desired timing requirements (i.e., cell sizing being proportional to charge retention and thus lock time longevity). Application of the memory lock 330 could also be recursive, which forces memory lock's 330 reset (i.e., recharge) during repeated access attempts.

Once the memory lock 330 is activated, an interrogator to regain access to the memory 312 is to sit-out and await deactivation of the memory lock 330 by the memory controller 310. As capacitor 324 discharges, the voltage of inverter 326 decreases until a threshold voltage is reached that deactivates inverter 326, which in turn deactivates memory lock 330. After memory lock 330 is deactivated, a subsequent RAC of memory 312 is allowed.

Figure 3B:
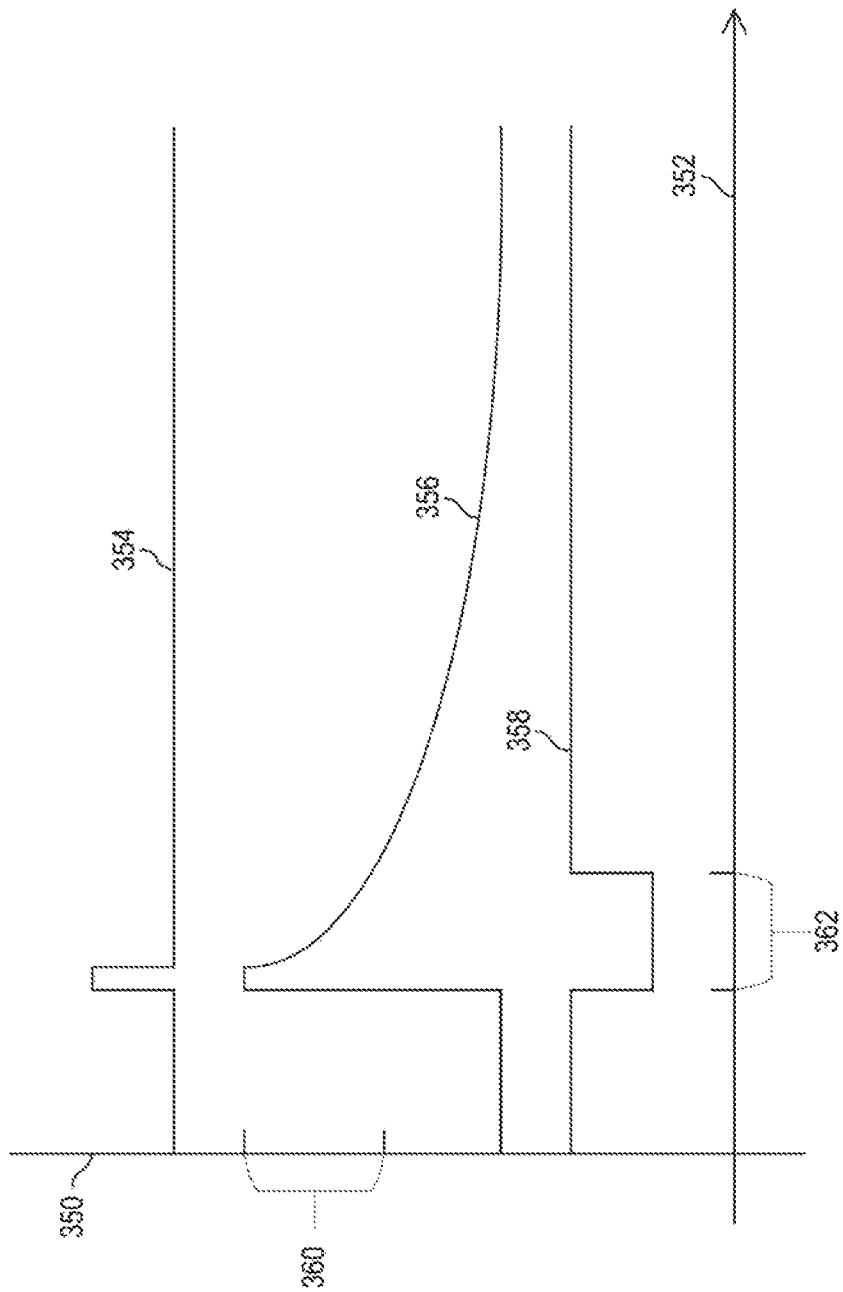
FIG. 3B is a block diagram of an example graph showing voltage of a locking mechanism over time when providing throttled data memory access.

FIG. 3B is an example graph showing the voltage 350 of read access 322, memory cell 318, and memory lock 330 over time 352. Read access voltage 354 shows a voltage increase and then decrease when a read access cycle is occurs. Memory cell voltage 356 shows memory cell 318 charging when the read access cycle occurs and then discharging gradually. Voltage range 360 is the voltage during which inverter 326 of memory cell 318 is active. Lock voltage 358 shows the duration 362 that memory lock 330 is active within the voltage range 360.

While FIG. 3A has been illustrated with a single cell and single lock pairing, any number of locks of this type could be implemented within a memory device, an internal access control logic, or within a shared memory controller. For example, each independently accessible memory word or line could have an associated memory lock 330. In this example, each memory location is independently and temporarily locked upon being read. In another example, the locks 330 could be more sparsely implemented with locks 330 provided on a per block basis (e.g. for flash memory type devices) or distributed in line with other internal memory divisions or partitions. Further, memory controller 310 can include a summating master lock (not shown), which triggers when a threshold level of line based locks are active. The summating master lock allows for the whole memory device to be locked after a pre-determined number of memory accesses are received within a specified time period (i.e., the summating master lock can be activated after a pre-determined number of lower-level memory locks 330 are activated).

Providing read locks on a per word line or block basis results in memory access throttling for memory elements have been previously addressed, but in certain cases, it may be beneficial to protect against multiple accesses regardless of the interrogated addressing. For example, the lock 330 could be implemented as a cascaded sequence (i.e., FIFO buffer) of write locks, each of which being discharged and cleared as per a single cell lock implementation. In this example, each read access to the memory results in setting a memory lock 330 and shifting the existing locks within the cascade (e.g. via charge sensing and transfer or by logic level based shifting). Subsequent memory reads can result in the cascade filling with active locks which, as before, can trigger a whole memory lock after a specific number of memory accesses are performed within the time constant of each individual lock 330.

In other cases, address (or address range) based read access flagging can be combined with sequential access flagging. Specifically, a cascaded access flag register (FIFO) can be provisioned per memory block. Accordingly, access throttling is triggered based on the number of blocks that have been read, number of times a particular block has been read, or on a combination of the two. Further, it may also be possible to search for specific memory access patterns and to lock on their detection.

Figure 4:
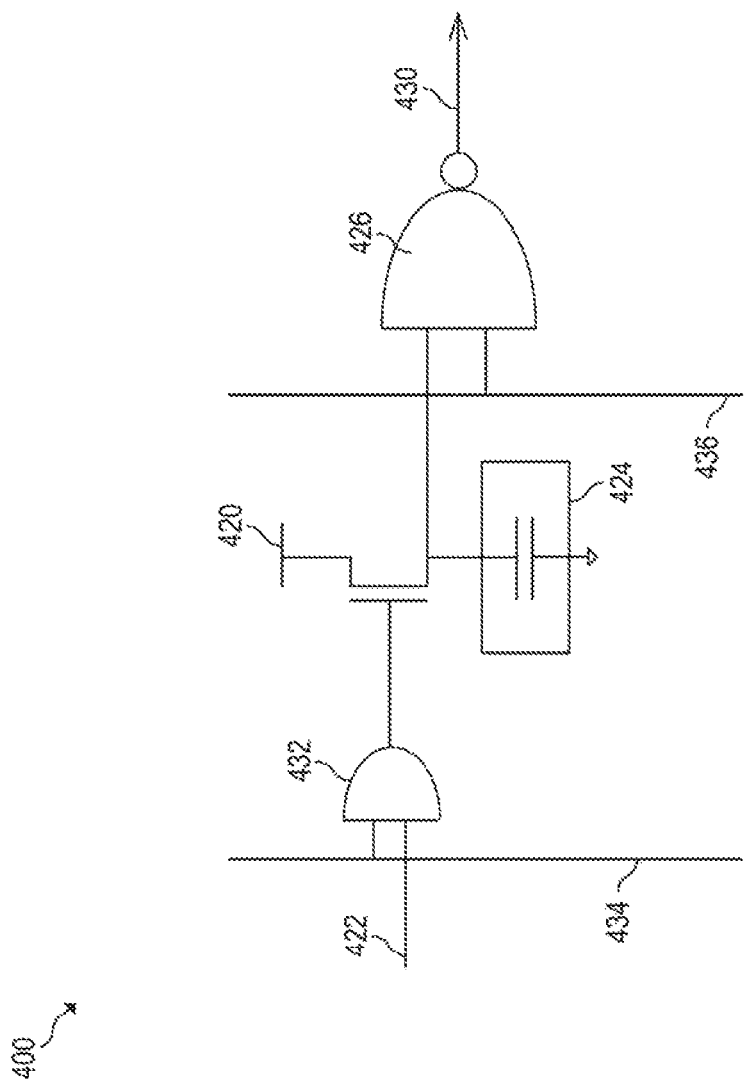
FIG. 4 is a block diagram of an example locking mechanism that includes control lines and is for throttling data memory access.

FIG. 4 is a block diagram of an example locking mechanism 400 that includes control lines and is for throttling data memory access. Locking mechanism 400 may include components that are similar to components of memory cell 318 of FIG. 3A. As shown, locking mechanism 400 includes supply voltage 420, read access 422, capacitor 424, NAND gate 426, memory lock 430, AND gate 432, access control line 434, and gate control line 436.

Similar to memory cell 318 of FIG. 3A, a signal is initiated at read access 422 and is pushed through by supply voltage 420. However, in this example, signals from access control line 434 and read access 422 are joined at AND gate 432. Access control line 434 initially has a logic high signal state, which allows the read access 422 signal to pass through the AND gate 432. If the access control line 434 signal is cleared to a logic low state, the AND gate 432 prevents the read access 422 signal from traveling towards NAND gate 426. However, any existing charges caused by previous read access cycles would cause memory lock 430 to be active until locking mechanism 400 discharged.

After the read access 422 signal passes through AND gate 432, the read access 422 signal is boosted by 420 supply voltage toward NAND gate 426. If gate control line 436 is set to a logic high state and capacitor 424 is charged above its threshold voltage, NAND gate 426 is active and, thus, memory lock 430 is active. At any time, gate control line's 436 signal can be cleared to a logic low state, which deactivates memory lock 430.

In addition to providing a means to optionally override the imposed data throttling scheme, locking mechanism 400 can also be manufactured as a flexibly designed generic part, which can be configured (i.e., customized) post-manufacture but prior to functional deployment. Various one-time fusing technologies exist for such purpose, and if used in combination with the data throttling techniques described above, could provide a device with one-time programmable data throttling parameters that an end-user could tune to their desired application.

In the examples thus far, a single memory device that supports a single point of data access (i.e., single read/write controller or data access port) are described. In other cases, data throttling could be well supported via a multi-port memory device, where a multitude of data access ports can be provisioned with differing operational performance criteria thereby providing the designer or systems implementer with differing memory accessibility speeds and data directionalities. For example, a two port memory device could support a throttled (i.e., low-bandwidth) read-only data access port along with a traditional (i.e., high bandwidth) read/write data access port. While implemented within the same design, potentially on the same silicon substrate, and providing access to the same memory pool, the two ports can be functionally distinct. In such implementations, the throttled port can be accessible to the outside (i.e., networked) world, where public or result orientated data would be stored, whereas the traditional read/write port could remain internally accessible for computation, analysis, caching of intermittent results, storage of historical raw data, etc.

While the previous examples are described using a physical memory device, it is also possible to implement memory access locks within a memory management unit (MMU) to provide and retain temporal knowledge of the data pages that have been accessed and throttled. In this case, virtual memory pages could be allocated to differing data access conditions or rules or could hardcode (e.g., within the MMU's translation logic) a pre-defined area of physical memory that should be throttled in a particular manner.

The memory management aspects of data throttling may also be applied as an extension to trusted computing scenarios, where the severity of the invoked data throttling action is in proportion to the level of trusted execution or, perhaps more simply, enabled or disabled as a function of the current trust execution state. Hardware architectures with support for multi-tier trusted computational states could be mapped to differing data throttling conditions in physical hardware. In addition, a single (preferably trusted) state within the hierarchy could provide access to data throttling controls (e.g. via a set of specific hardware registers) that could determine the data access privileges and data throttling characteristics observed when executing code from within the remaining execution states.

Furthermore, while the examples described above are in the context of read access privileges to distributed computing nodes, the notion is extensible to other application areas (e.g., throttling access to information stored on a USB memory device). Like-wise, data throttling as described herein use could be applied to write throttling, network switch throughput limitations, etc. Also, alternate implementation for the memory locks such as a clocked state machine, an internally or externally tuned R/C time constant, etc. are also feasible.

The foregoing disclosure describes a number of examples for providing throttled data memory access. In this manner, the examples disclosed herein enable throttled data memory access at a hardware level by using a memory cell as a locking mechanism to throttle data memory access in response to read cycles.

We claim:

1. A system comprising:
   a memory to store data for the system;
   a memory controller comprising a locking mechanism, the memory controller to:
     after receiving a first read access cycle, use the locking mechanism to activate a self-clearing memory lock, the self-clearing memory lock comprising an element to be charged responsive to the first read access cycle;
     while the self-clearing memory lock is active, prevent responses to subsequent read access cycles; and
     after the self-clearing memory lock deactivates responsive to discharging of a voltage of the element over time below a threshold voltage as part of a self-expiration of the self-clearing memory lock, respond to a second read access cycle with access to the memory.

2. The system of claim 1, wherein the self-clearing memory lock is active for a preconfigured lock duration that restricts access to a maximum number of read access cycles per second.

3. The system of claim 1, wherein the self-clearing memory lock is one of a plurality of self-clearing memory locks, and each of the plurality of self-clearing memory locks is associated with one of a plurality of portions of the memory.

4. The system of claim 3, wherein the memory controller is further to, in response to a lock threshold of the plurality of self-clearing memory locks being activated, activate a master lock associated with the plurality of self-clearing memory locks, wherein an entirety of the memory is inaccessible when the master lock is active.

5. The system of claim 4, wherein receiving the first read access cycle satisfies the lock threshold when a preconfigured number of read access cycles is received within a time interval.

6. The system of claim 1, wherein the locking mechanism comprises a switch to charge the element using a supply voltage in response to a signal of the first read access cycle.

7. The system of claim 6, further comprising a logic gate having an input connected to the element, the logic gate to output a signal that is set to a first state responsive to the element being charged, and set to a second state different from the first state responsive to the element being discharged below the threshold voltage.

8. The system of claim 7, wherein the logic gate comprises an inverter or a NAND gate.

9. The system of claim 6, further comprising a control line that when set to a first state allows the signal of the first read access cycle to activate the switch to charge the element, and when set to a second state different from the first state prevents the signal of the first read access cycle from activating the switch to charge the element.

10. The system of claim 1, wherein the element comprises a capacitor.

11. A method for providing throttled data memory access, the method comprising:
 in response to receiving a first read access cycle, charging an element of a self-clearing lock to lock access to a memory;
 while the element remains charged above a threshold voltage, preventing responses to subsequent read access cycles; and
 after a voltage of the element discharges over time to below the threshold voltage as part of a self-expiration of the self-clearing lock, allow access of the memory in response to a second read access cycle.

12. The method of claim 11, further comprising activating a control line to prevent the element from charging.

13. The method of claim 11, wherein the self-clearing lock is active for a preconfigured lock duration that restricts access of a portion of the memory to a maximum number of read access cycles per second.

14. The method of claim 11, wherein the element comprises a capacitor.

15. The method of claim 11, wherein charging the element comprises activating a switch in response to the first read access cycle to charge the element, wherein the element discharges after the switch is deactivated after completion of the first read access cycle.

16. A controller for a memory, comprising:
 a self-clearing lock comprising:
  a chargeable element;
  a switch activatable by a read access signal of a first read access cycle to charge the element; and
  a logic gate having an input connected to the element, the logic gate to output a lock signal that is set to a first state responsive to the element being charged, and set to a second state different from the first state responsive to a voltage of the element decaying over time below a threshold voltage as part of a self-expiration of the self-clearing lock,
 the lock signal when set to the first state preventing access of a portion of the memory in response to subsequent read access cycles after the first read access cycle, and
 the lock signal when set to the second state allowing access of the portion of the memory in response to a second read access cycle after the first read access cycle.

17. The controller of claim 16, wherein the element comprises a capacitor.

18. The controller of claim 17, wherein the capacitor is to discharge after deactivation of the switch after completion of the first read access cycle.

* * * * *